(12) United States Patent
Minari

(10) Patent No.: US 8,635,610 B2
(45) Date of Patent: Jan. 21, 2014

(54) MANAGEMENT SYSTEM AND MANAGEMENT METHOD

(75) Inventors: Makoto Minari, Yokohama (JP);
Yoshiko Minari, legal representative, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1507 days.

(21) Appl. No.: 12/019,686

(22) Filed: Jan. 25, 2008

(65) Prior Publication Data
US 2008/0288943 A1  Nov. 20, 2008

(30) Foreign Application Priority Data

Feb. 1, 2007  (JP) ................................ 2007-023383

(51) Int. Cl.
*G06F 9/44* (2006.01)
*G06F 9/445* (2006.01)
*G06F 9/46* (2006.01)

(52) U.S. Cl.
USPC .......... 717/174; 717/168; 717/169; 717/175; 717/176; 718/100; 718/104

(58) Field of Classification Search
None
See application file for complete search history.

(56) References Cited

U.S. PATENT DOCUMENTS

| | | | |
|---|---|---|---|
| 6,202,207 B1* | 3/2001 | Donohue | 717/173 |
| 6,996,819 B1* | 2/2006 | Alanis | 717/173 |
| 7,082,555 B2 | 7/2006 | Toyooka et al. | 714/48 |
| 7,093,247 B2* | 8/2006 | Ashworth et al. | 717/174 |
| 7,127,712 B1* | 10/2006 | Noble et al. | 717/173 |
| 7,304,758 B2* | 12/2007 | Ferlitsch | 358/1.15 |
| 7,530,065 B1* | 5/2009 | Ciudad et al. | 717/174 |
| 7,913,247 B2* | 3/2011 | Diederichs | 717/173 |
| 2003/0184784 A1* | 10/2003 | Ferlitsch | 358/1.13 |
| 2003/0217065 A1* | 11/2003 | Yokota | 707/100 |
| 2004/0025157 A1* | 2/2004 | Blight et al. | 717/174 |
| 2004/0153990 A1* | 8/2004 | Chen et al. | 717/100 |
| 2006/0080656 A1* | 4/2006 | Cain et al. | 717/174 |
| 2006/0112375 A1* | 5/2006 | Schneider | 717/131 |
| 2006/0206861 A1* | 9/2006 | Shenfield et al. | 717/106 |
| 2006/0225068 A1* | 10/2006 | Bennett et al. | 717/168 |
| 2007/0274337 A1* | 11/2007 | Purpura | 370/465 |
| 2008/0126773 A1* | 5/2008 | Martinez et al. | 713/1 |

FOREIGN PATENT DOCUMENTS

| | | | | |
|---|---|---|---|---|
| JP | 01-175040 | 7/1989 | | G06F 9/46 |
| JP | 2-100718 | 4/1990 | | G06F 9/065 |
| JP | 2003-256225 A | 9/2003 | | |
| WO | WO 99/46678 | 9/1999 | | G06F 9/46 |
| WO | WO 2004/028182 | 4/2004 | | H04Q 7/32 |

* cited by examiner

*Primary Examiner* — Charles Swift

(74) *Attorney, Agent, or Firm* — Ftizpatrick, Cella, Harper & Scinto

(57) ABSTRACT

A system for managing a component or application determines whether to allow changeover of a component, which is used by an application, or launch of an application in accordance with amount of resources set for a component and used by the component.

13 Claims, 12 Drawing Sheets

FIG. 4

| COMPONENT NAME | COMPONENT TYPE | DEFAULT COMPONENT CLASS NAME | NUMBER OF COMPONENTS USED |
|---|---|---|---|
| Panel 1 | AbstractPanel | SimplePanel | 3 |
| Panel 2 | AbstractPanel | SimplePanel | 3 |
| Button | AbstractButton | SimpleButton | 10 |
| ... | ... | ... | ... |

| MEMORY CAPACITY | DISK CAPACITY | NUMBER OF FILES | NUMBER OF SOCKETS | NUMBER OF THREADS |
|---|---|---|---|---|
| 200KB | 100MB | 5 | 2 | 4 |

601, 602, 603, 604, 605

MANAGEMENT SYSTEM AND MANAGEMENT METHOD

BACKGROUND OF THE INVENTION

1. Field of the Invention

The present invention relates to a management system and method for managing a component used by an application or for managing the application.

2. Description of the Related Art

A technique for customizing an application and a technique for upgrading the application exist in the prior art. In particular, a system that makes it possible to expand the functions of a platform by a plug-in mechanism is known (e.g., see WO2004/028182). Further, a system for performing upgrade of a software module without an attendant change in an application is known (e.g., see WO99/46678).

Furthermore, in a system for installing a program dynamically, it is known to control whether or not to perform the installation upon examining availability of system resources at the time of installation (e.g., see US2003/217065).

SUMMARY OF THE INVENTION

Accordingly, an object of the present invention is to determine whether or not to allow changeover of a component in accordance with amount of resources used by the component.

The present invention provides a management system for managing a component used by an application, the system comprising an input unit adapted to input a command for changing over a component used by an application; and a determination unit adapted to determine whether to allow changeover of the component in accordance with amount of resources, which are used by a component after the changeover, set for the component after the changeover in response to the command.

Another object of the present invention is to determine whether to allow launch of an application in accordance with amount of resources used by a component.

A further object of the present invention is to provide a management system for managing an application, the system comprising an input unit adapted to input a command for launching an application; and a determination unit adapted to determine whether to allow launch of an application in accordance with amount of resources, which are used by a component, set for the component used by the application for which launch has been commanded.

According to one aspect of the present invention, there is provided a management system for managing a component used by an application, the system comprising:

an input unit adapted to input a command for changing over a component used by an application; and a determination unit adapted to determine whether to allow changeover of the component in accordance with amount of resources, which are used by a component after the changeover, set for the component after the changeover in response to the command.

According to another aspect of the present invention, there is provided a management method for managing a component used by an application, the system comprising:

an input step of inputting a command for changing over a component used by an application; and a determination step of determining whether to allow changeover of the component in accordance with amount of resources, which are used by a component after the changeover, set for the component after the changeover in response to the command.

According to still another aspect of the present invention, there is provided a management system for managing an application, comprising:

input unit adapted to input a command for launching an application; and a determination unit adapted to determine whether to allow launch of an application in accordance with amount of resources, which are used by a component, set for the component used by the application for which launch has been commanded.

According to yet another aspect of the present invention, there is provided a management method for managing an application, comprising:

an input step of inputting a command for launching an application; and a determination step of determining whether to allow launch of an application in accordance with amount of resources, which are used by a component, set for the component used by the application for which launch has been commanded.

Further features of the present invention will become apparent from the following description of exemplary embodiments with reference to the attached drawings.

BRIEF DESCRIPTION OF THE DRAWINGS

FIG. 4 is a diagram schematically illustrating the details of used component information;

FIG. 5 is a diagram schematically illustrating the details of system resource information;

DESCRIPTION OF THE EMBODIMENTS

A preferred embodiment of the present invention will now be described in detail with reference to the accompanying drawings.

Figure 1:
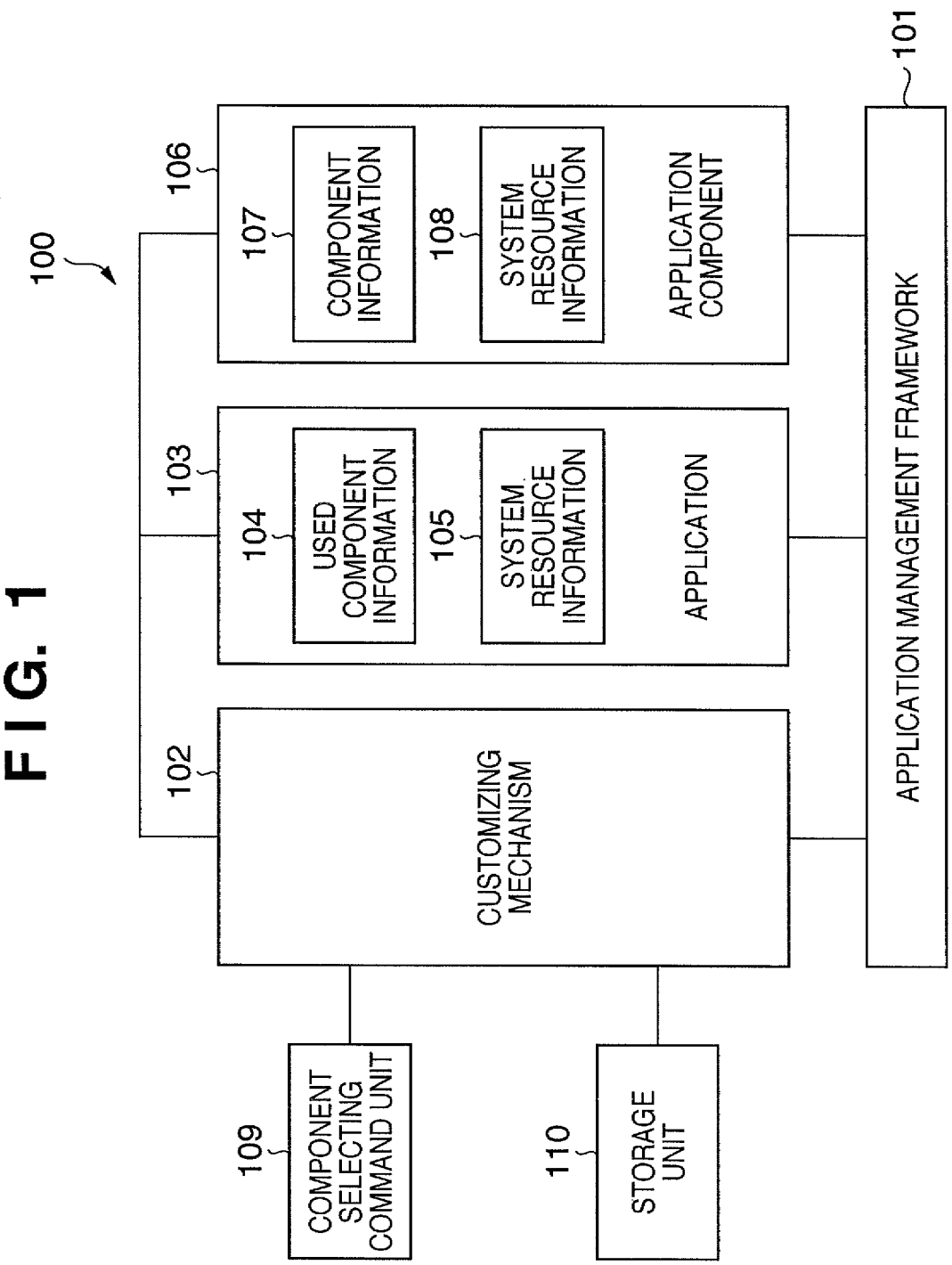
FIG. 1 is a diagram schematically illustrating the functional configuration of an application management system according to an embodiment of the present invention.

FIG. 1 is a diagram schematically illustrating the functional configuration of an application management system 100 according to an embodiment of the present invention. It should be noted that the configuration of the application management system shown in FIG. 1 is merely one example. If the environment for executing this system has been installed, implementation is possible by any device. Further, it may be so arranged that the requisite elements thereof are implemented upon being dispersed among a plurality of devices.

The application management system 100 in FIG. 1 has an application management framework 101 for managing application programs (referred to simply as "applications" below) 103.

A customizing mechanism 102 functions to customize the application 103 by performing component changeover.

Each individual application 103 is the unit of management of the application management framework 101. The latter installs one to a plurality of applications 103 in the application management system 100. The application management framework 101 performs management of overall life cycle that includes starting, quitting and uninstalling applications 103.

The applications 103 hold information, which relates to components (referred to as "application components" below) used by the applications 103, as used component information 104. Furthermore, the applications 103 hold information, which indicates amount of system resources used by the applications 103, as system resource information 105.

Application components 106 are capable of being used by the applications 103. The individual application components 106 also are units of management by the application management framework 101.

The application management framework 101 installs or uninstalls one to a plurality of the application components 106 in the application management system 100.

The application components 106 hold information relating to the application components 106 as component information 107. Furthermore, the application components 106 hold information, which indicates amount of system resources used by the application components 106, as system resource information 108.

A component selecting command unit 109 specifies selection of application components 106 at the time of component changeover. A storage unit 110 stores the various management information of the application components 106, described later.

Figure 2:
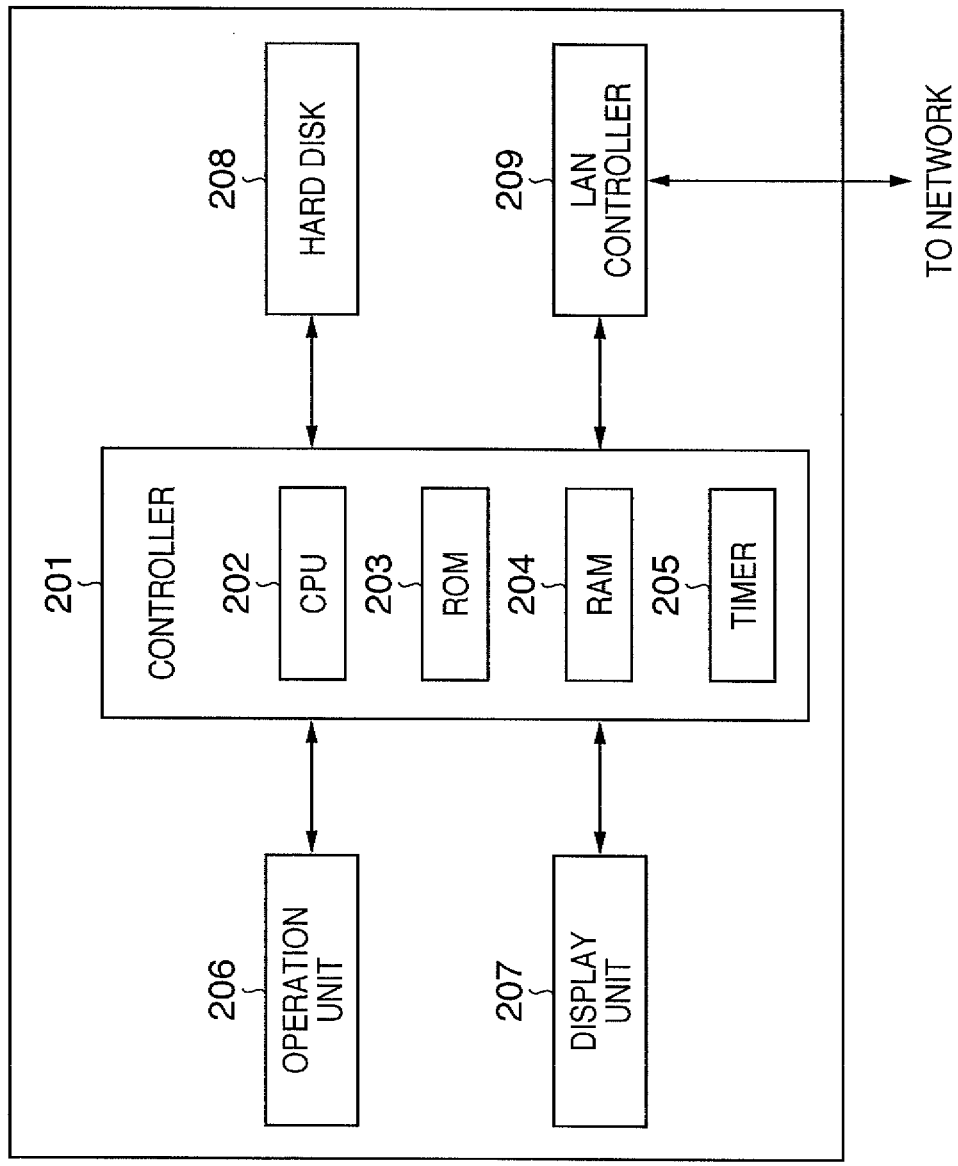
FIG. 2 is a block diagram illustrating the hardware configuration of the application management system.

FIG. 2 is a block diagram illustrating the hardware configuration of the application management system 100.

The application management system 100 has a controller 201, an operation unit 206, a display unit 207, a hard disk 208 and a LAN controller 209 as the main requisite constituents. The controller 201 controls the application management system 100. The operation unit 206 is constituted by input means such as a keyboard and mouse. The LAN controller 209 is for allowing the application management system 100 to communicate with external devices via a network.

The controller 201 has a CPU 202, a ROM 203, a RAM 204 and a timer 205, etc. Various programs executed by the CPU 202 and data necessary for the programs have been stored in the ROM 203 beforehand. Some of the programs and data has been stored on the hard disk 208 in advance and can be read out to the RAM 204 and executed. The timer 205 is used to measure various time periods. The hardware configuration of the application management system 100 according to this embodiment is not limited to that shown in FIG. 2; some parts of the configuration need not be provided and other parts may be provided.

The component selecting command unit 109 of FIG. 1 is constituted by the operation unit 206 and display unit 207. The storage unit 110 corresponds to a storage area constituting part of the RAM 204, by way of example. The customizing mechanism 102 and application management framework 101 are implemented in response to the CPU 202 loading the applicable program from the hard disk 208 to the RAM 204 and then executing the program. Further, the application management framework 101 includes part of the storage area of the RAM 204 for storing application list information 300, described later. The applications 103 and application components 106 have been stored in the hard disk 208.

Described next will be a procedure whereby application 103 registers information relating to application component 106 in the customizing mechanism 102. The procedure for registering information relating to the application component 106 is executed by installing application 103 or starting application 103.

First, application 103 acquires an application ID, which is for distinguishing this application 103 from other applications, from the application management framework 101.

It is possible for a plurality of applications 103 to be installed separately in the application management system 100. The application management framework 101 assigns an application ID to each application 103 and uses the application IDs to identify the respective applications 103.

Figure 3:
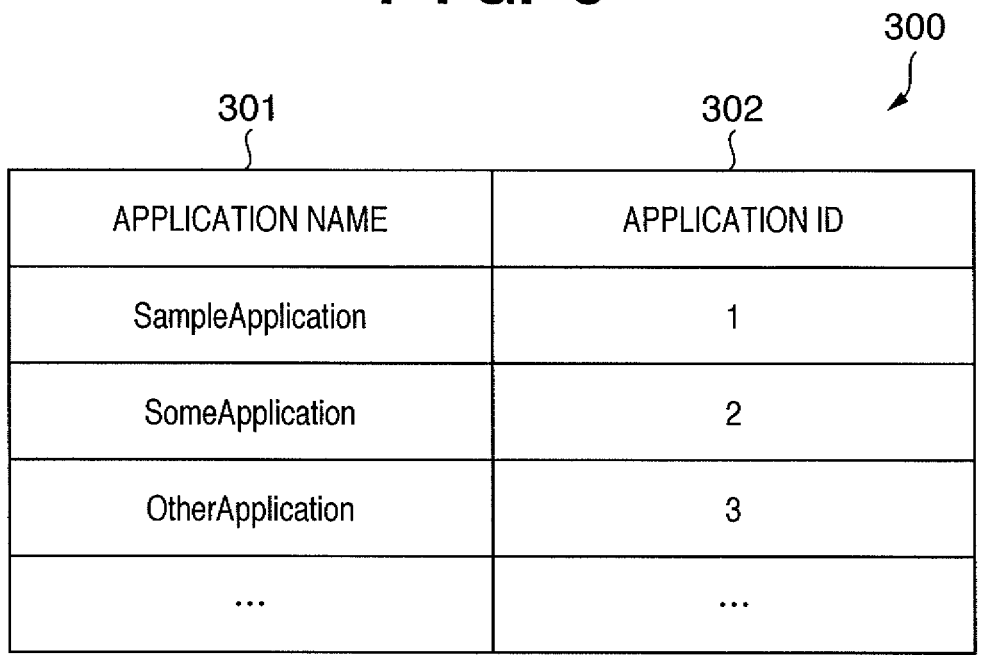
FIG. 3 is a diagram schematically illustrating application list information illustrating a list of applications installed in the application management system.

FIG. 3 is a diagram schematically illustrating application list information illustrating application list information 300 indicating a list of applications 103 installed in the application management system 100. The application list information 300 is generated by the application management framework 101 and is stored in the application management framework 101.

When the application management framework 101 installs application 103, the application name 301 of this application 103 and the application ID 302 that has been assigned to this application 103 are correlated. The correlated list information is handled as the application list information 300 and is stored in the application management framework 101.

If there is a request from application 103, the application management framework 101 refers to the application list information 300 and sends back the application ID 302 applicable to the request. That is, application 103 issues a request to acquire the application ID that contains its own application name. The application management framework 101 sends the application ID associated with the application name contained in this request back to application 103.

Next, application 103 acquires the object of the customizing mechanism 102. Application 103 then acquires information such as the name of the application component 106 that it itself uses and the type of application component 106 from used component information 104 and registers this information in the customizing mechanism 102.

FIG. 4 is a diagram schematically illustrating the details of the used component information 104. The used component information 104 is data held in application 103.

As illustrated in FIG. 4, the used component information 104 includes, for every component name 401, a component type 402, a default component class name 403 and number 404 of components used.

The component name 401 is the name of the application component 106 used by the application 103. The component type 402 is the type of application component 106 used by the application 103. The default component class name 403 is the class name of the application component 106 used in a case where the application component 106 has not been explicitly selected by the user. It should be noted that it is possible for the default component class name 403 to be removed from the used component information 104. The number 404 of components used indicates the number of application components 106 used by the application 103.

The example of FIG. 4 indicates that application 103 is using application components 106 whose component names are "Panel 1", "Panel 1" and "Button", etc. Further, FIG. 4 indicates that in relation to application component 106 whose component name is "Panel 1", the component type is "Abstract Panel", the default component class name is "Simple Panel" and the number of components used is "3".

Next, application 103 acquires the amount of system resources used by this application from system resource information 105 and registers this in the customizing mechanism 102.

FIG. 5 is a diagram schematically illustrating the details of the system resource information 105. The system resource information 105 is data held in application 103.

As illustrated in FIG. 5, the system resource information 105 includes memory capacity 601, disk capacity 602, number 603 of files, number 604 of sockets and number 605 of threads. The memory capacity 601 is the memory capacity used by the application 103. The disk capacity 602 is the hard-disk capacity used by the application 103. The number 603 of files is the number of files used by the application 103, the number 604 of sockets is the number of sockets used by the application 103, and the number 605 of threads is the number of threads used by the application 103. In this embodiment, the memory capacity 601, disk capacity 602, number 603 of files, number 604 of sockets and number 605 of threads are all handled as the system resource information 105. However, the present invention is not limited to this arrangement; at least one of these elements may be adopted as system resource information and elements other than these may be added on as system resource information.

The customizing mechanism 102 stores the name of the application component 106 used, the type of the application component 106, etc., and the amount of system resources used in the storage unit 110 as application information 701.

Figure 6:
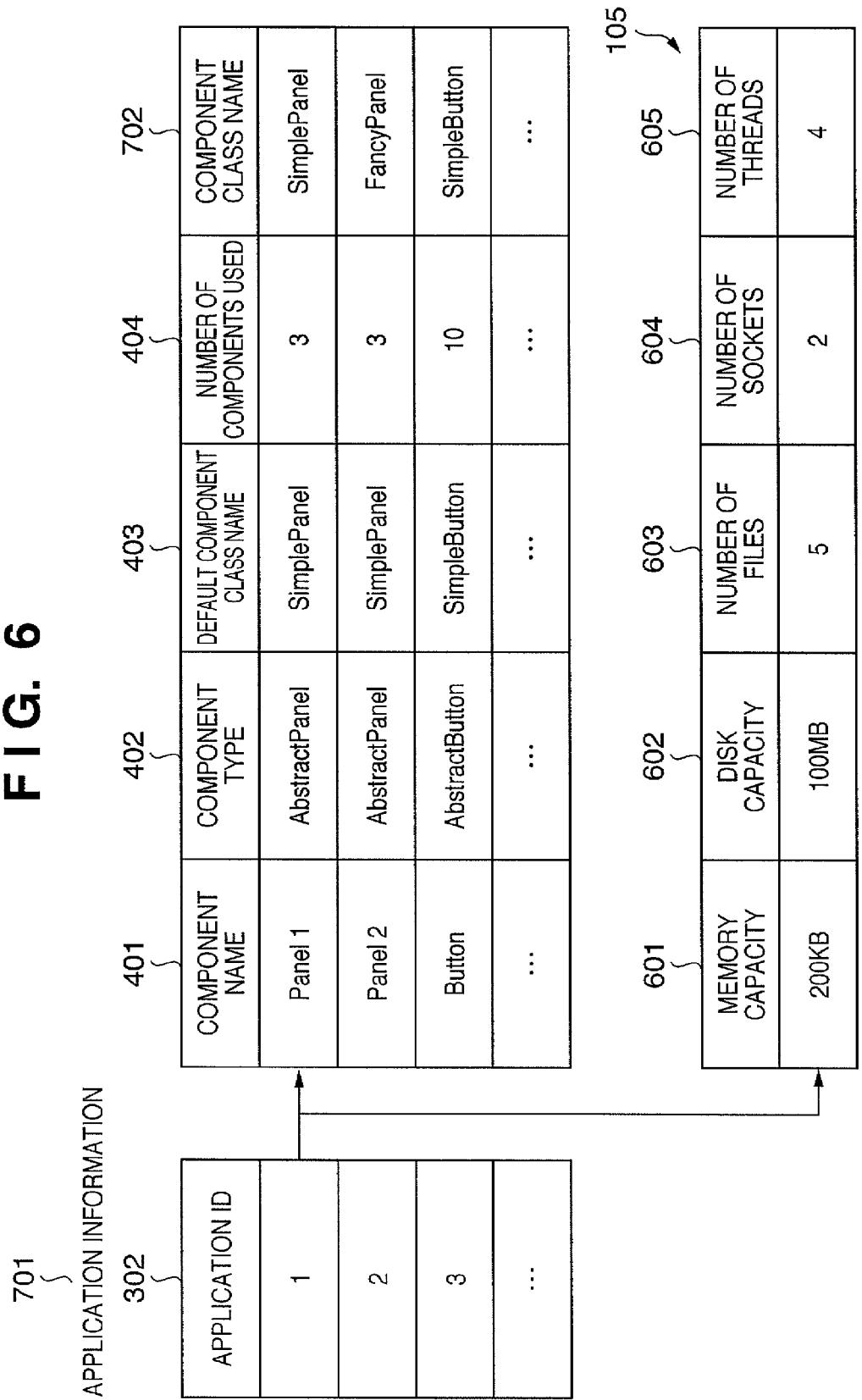
FIG. 6 is a diagram schematically illustrating the composition of application information.

FIG. 6 is a diagram schematically illustrating the composition of the application information 701. The application information 701 holds, for every application ID 302, information (name of the application component 106 used, type of the application component 106, etc., and amount of system resources used) that is the object of registration at steps S1103 and S1104, described later. It should be noted that in the procedure whereby application 103 registers information relating to application component 106 in the customizing mechanism 102, a component class name 702 is not an object of registration. This will be described later.

Figure 7:
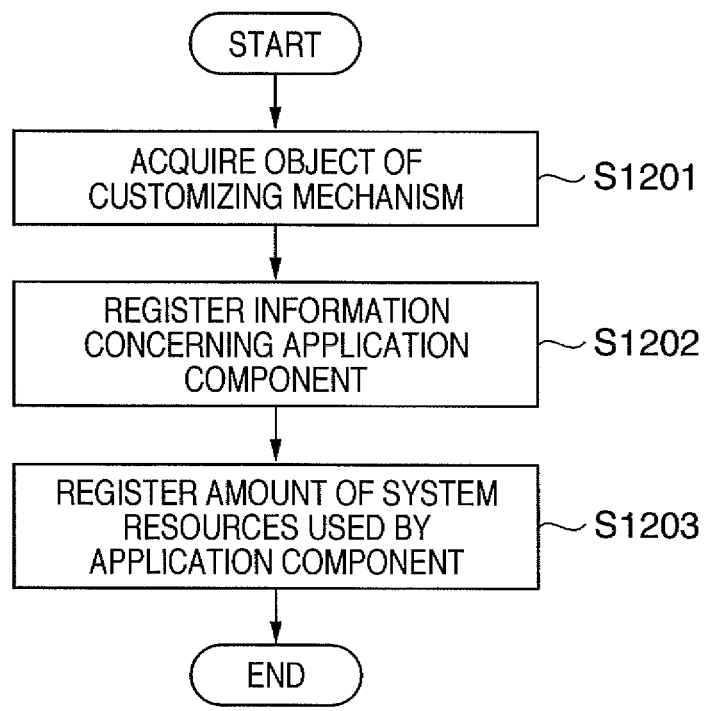
FIG. 7 is a flowchart illustrating a procedure according to which an application component registers information relating to the application component in a customizing mechanism.

Next, reference will be had FIG. 7 to describe a procedure according to which application component 106 registers information relating to the application component 106 in the customizing mechanism customizing mechanism 102. FIG. 7 is a flowchart illustrating a procedure according to which the application component 106 registers information relating to the application component 106 in the customizing mechanism 102. The processing shown in FIG. 7 is executed by installing application component 106 or starting application component 106.

First, application component 106 acquires the object of customizing mechanism 102 (step S1201).

Next, the application component 106 acquires information such as its own class name and type from the component information 107 and registers this information in the customizing mechanism 102 (step S1202).

The component information 107 is data held in the application component 106. The component information 107 includes the component type and component class name of the application component 106.

The component type is the type of application component 106. The component class name is the class name of the application component 106 and is a name that indicates the installed type of application component 106. For example, the component type of the application component 106 is "Abstract Panel", and the component class name of the application component 106 is "Simple Panel".

Next, the application component 106 acquires the amount of system resources that it itself uses from the system resource information 108 and registers this in the customizing mechanism 102 (step S1203). The details of the system resource information 108 is the same as that shown in FIG. 5. The system resource information 108 is data held in the application component 106.

The customizing mechanism 102 stores the class name and type, etc., of the application component 106 and the amount of system resources used, which were registered at steps S1202 and S1203, in the storage unit 110 as application component information 703.

Figure 8:
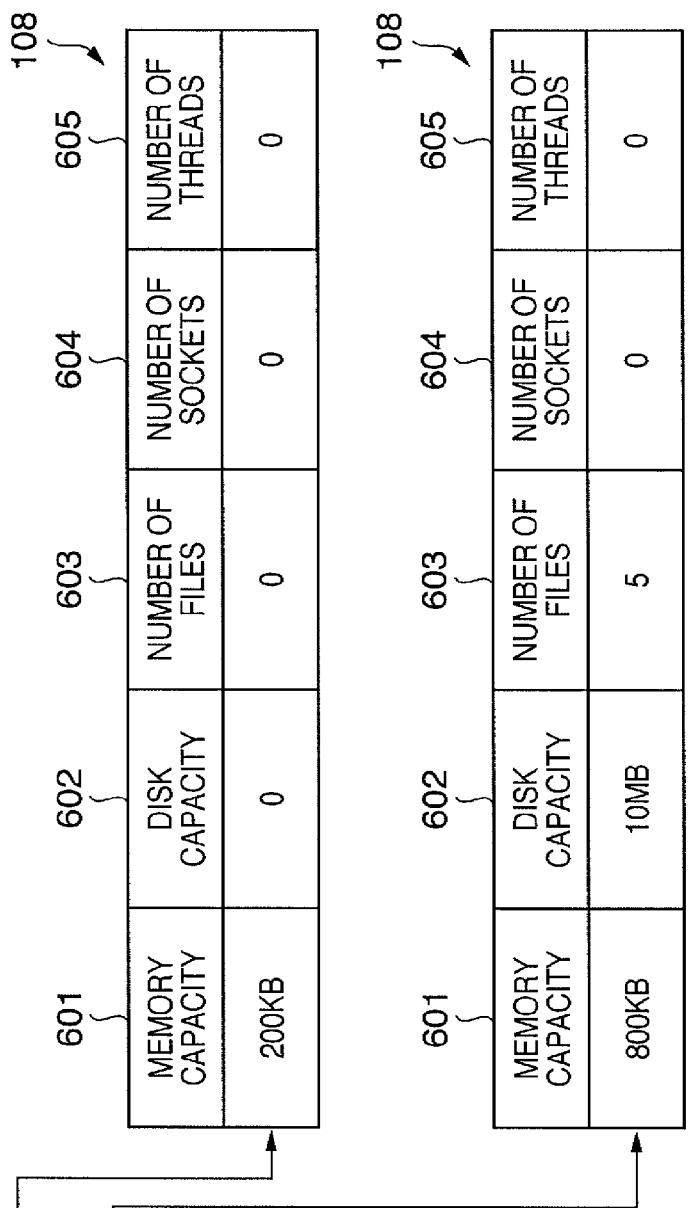
FIG. 8 is a diagram schematically illustrating the composition of application component information.

FIG. 8 is a diagram schematically illustrating the composition of the application component information 703. As illustrated in FIG. 8, the application component information 703 is such that a component class name 502 is associated with every component type 501 and amount of system resources used is associated with every component class name 502. The application component information 703 holds the information (class name and type, etc., of application component 106 and amount of system resources used), which has been registered at steps S1202 and S1203, by this data structure.

Figure 9:
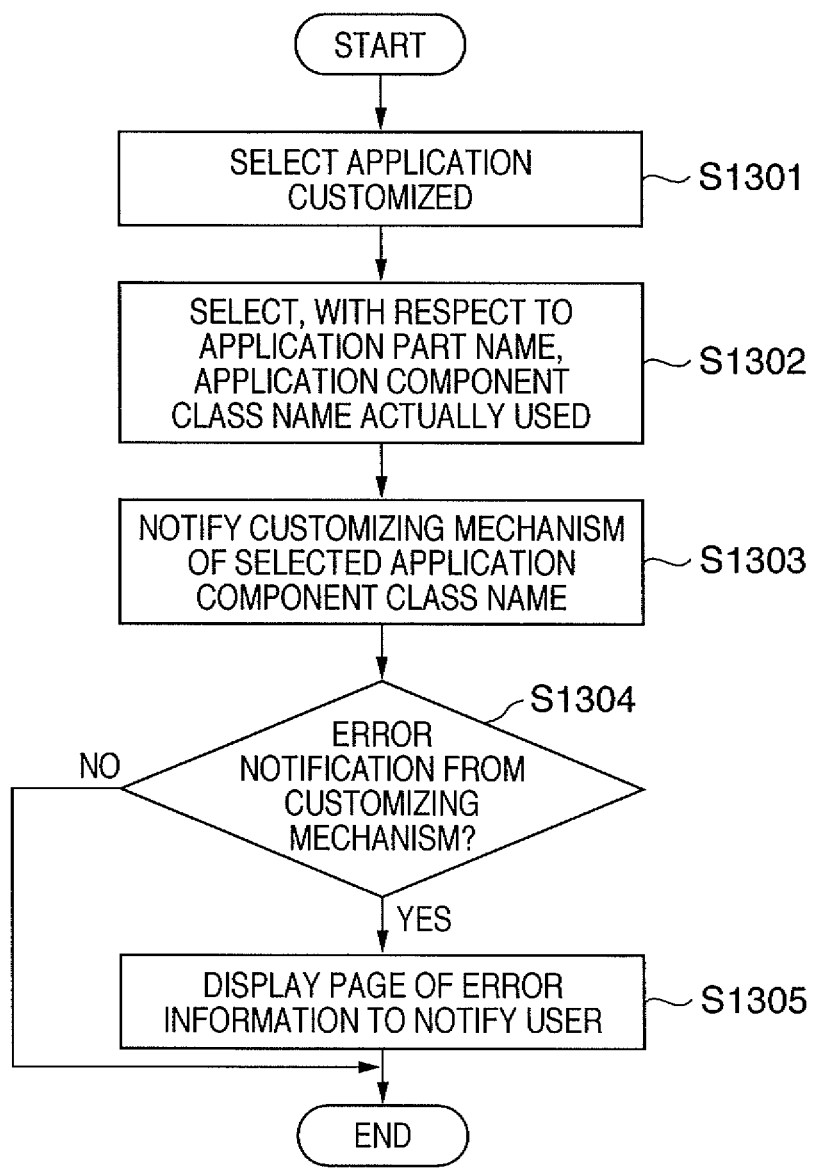
FIG. 9 is a flowchart illustrating a procedure for selecting an application component conforming to operation of component selection command unit by a user.

Next, reference will be had to FIG. 9 to describe a procedure for selecting an application component 106 conforming to operation of the component selecting command unit 109 by a user. FIG. 9 is a procedure for selecting an application component 106 conforming to operation of the component selecting command unit 109 by a user.

The component selecting command unit 109 comprises the display unit 207 and operation unit 206. Selection of the application component 106 is performed by the user operating the operation unit 206 upon referring to the user interface displayed on the display unit 207. In this embodiment, the user interface is displayed on the display unit 207 using a Web browser, although the present invention is not limited to this arrangement. For example, the component selecting command unit 109 may be provided in a system outside the application management system 100. In such case the customizing mechanism 102 of the application management system 100 is sent to a Web page, which is for selecting the application component 106, via the Internet or an intranet. The component selecting command unit 109 displays a Web interface for selecting the application component 106 that is based upon this Web page.

In the procedure for selecting the application component 106, first the user selects the application 103 for which the application component 106 is to be set (step S1301).

The application selection screen displayed on the display unit 207 by the Web browser at this time includes a list display section and a setting button for applications 103. The customizing mechanism 102 acquires the application name 301 from the application list information 300 in the application management framework 101 and displays a list of applications. The user selects one application 103 from the list and presses the setting button.

On the basis of the application 103 selected by the user, the customizing mechanism 102 next displays a page for selecting the application component 106.

Figure 10:
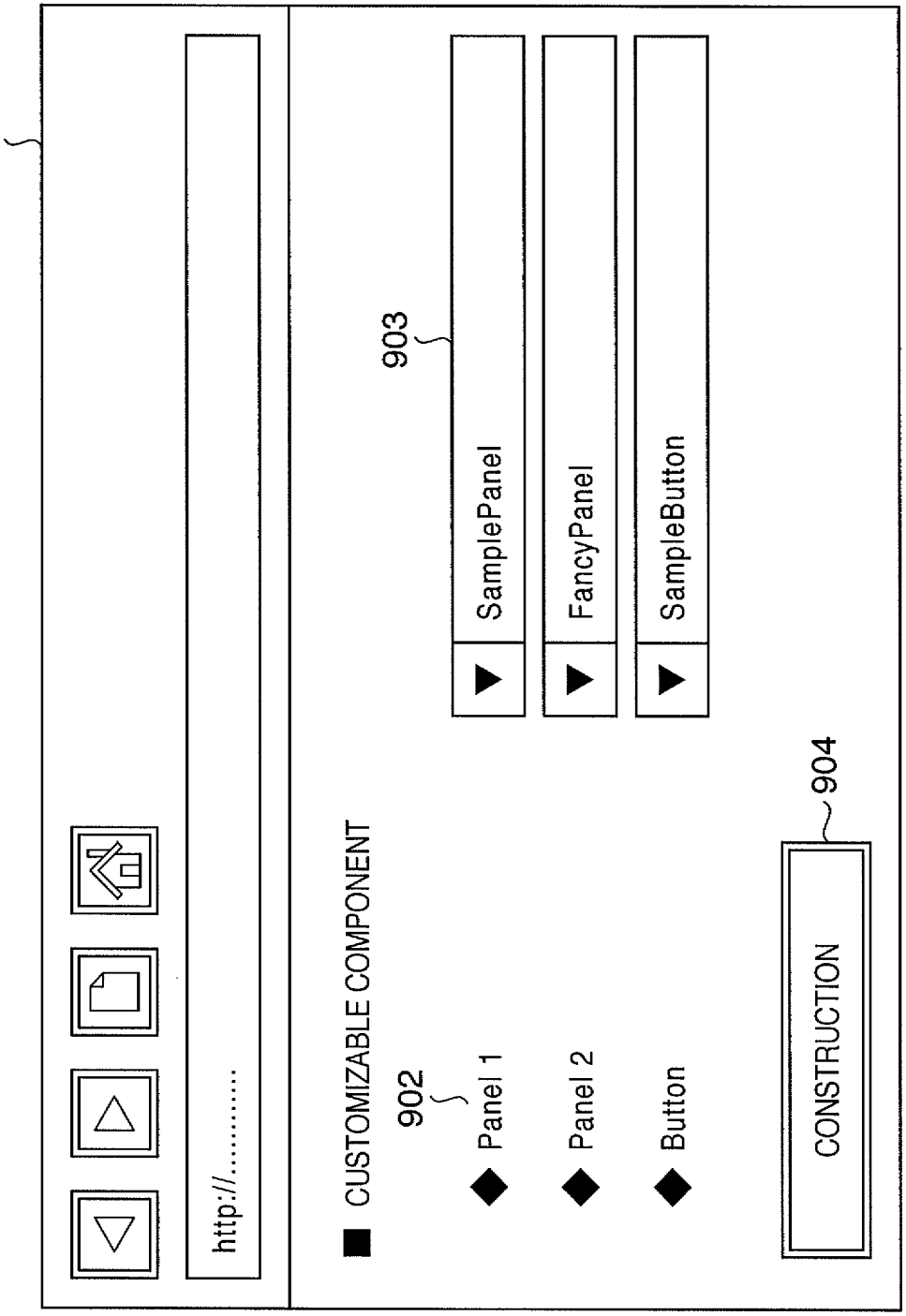
FIG. 10 is a diagram illustrating an example of a screen for selecting an application component.

As shown in FIG. 10, a screen 901 for selecting an application component is displayed by the Web browser. A list display section 902 displays a list of names of application components used by the application 103 selected on the application selection screen. A section 903 displays the names of component classes of the application component 106 selected in correspondence with each application component name. A construction button 904 is used to enter the component classes selected by the user.

The information displayed in the list display section 902 of application component names is acquired from the component names 401 associated with the application ID of the selected application 103 in the application information 701 illustrated in FIG. 1. The information displayed in the section 903 that displays the names of component classes is acquired from the component class names 702 associated with every component name 401 in the application information 701. When a setting is first made, however, nothing will have been registered in the component class names 702. When a default component class name 403 has been set, this is displayed, but when a default component class name 403 has not been set, nothing is displayed in the section 903 that displays the names of component classes.

The information of section 903 that displays the names of component classes is displayed by embedding a component class name 502, which corresponds to the component type 501 identical with the component type 402, held in the application component information 703 in the display page by the customizing mechanism 102.

In the application information 701 shown in the example of FIG. 6, the component type 402 corresponding to "Panel 2" of the component name 401 is "Abstract Panel". In the application component information 703 shown in FIG. 8, "Simple Panel" and "Fancy Panel" exists under component class name 502 corresponding to "Abstract Panel" of the component type 501. Accordingly, "Simple Panel" and "Fancy Panel" are displayed with respect to "Panel 2" in the class name display section 903. The user can select one panel from "Simple Panel" and "Fancy Panel".

By using the above-described user interface, the user can select the class name of the actually used application component 106 with respect to each application component name. The component selecting command unit 109 accepts the content of the operation performed by the user (step S1302).

The component selecting command unit 109 notifies the customizing mechanism 102 of the application ID of the selected application 103 and the class name of the application component 106 selected for every application component name (step S1303).

The component selecting command unit 109 then discriminates the result of setting of the application component 106 by the customizing mechanism 102 (step S1304). In a case where notification of error is received from the customizing mechanism 102, the component selecting command unit 109 displays error information to so notify the user (step S1305).

The error information is displayed in a form superimposed on the application component selecting screen illustrated in FIG. 10. For example, a dialog box indicating "PANEL 2 CANNOT BE SET BECAUSE SYSTEM RESOURCES ARE INADEQUATE. MEMORY IS EXCEEDED BY 2 MB." can be mentioned as error information.

Figure 11:
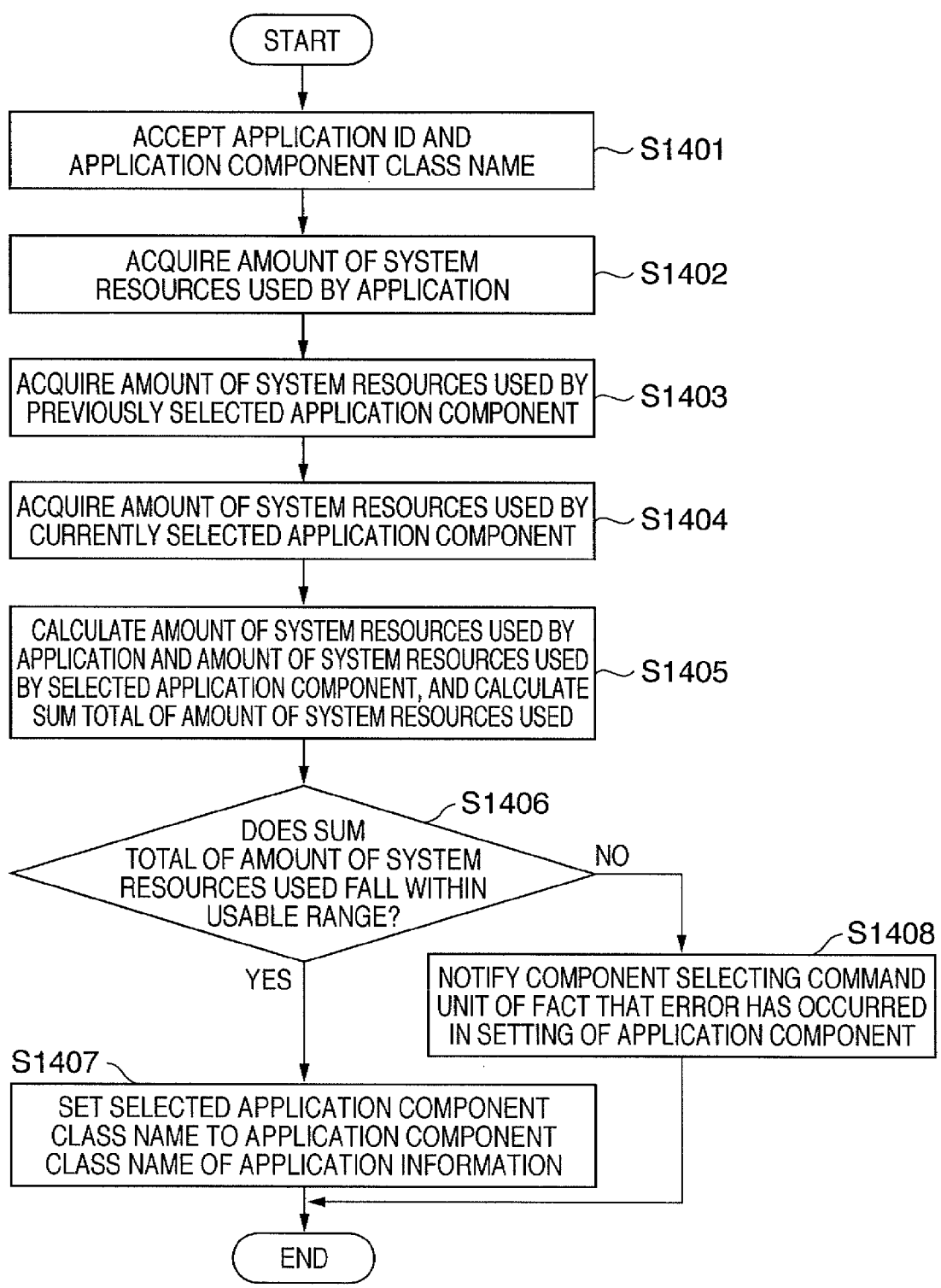
FIG. 11 is a flowchart illustrating a procedure for setting an application component by a customizing mechanism.

Next, reference will be had to FIG. 11 to describe a procedure for setting application component 106 by the customizing mechanism 102. FIG. 11 is a flowchart illustrating a procedure for setting application component 106 by the customizing mechanism 102.

The customizing mechanism 102 accepts an application ID and a component class name corresponding to each application component name from the component selecting command unit 109 as information specifying changeover content of application component 106 (step S1401). Notification from the component selecting command unit 109 is the notification performed at step S1303.

Next, the customizing mechanism 102 acquires the system resource information 105 pertaining to the application ID from the application information 701 shown in FIG. 6 (step S1402).

Next, the customizing mechanism 102 obtains a previously selected component class name 702 of the application component 106 pertaining to the application ID from the application information 701. The customizing mechanism 102 then acquires the system resource information 108 pertaining to the component class name 702 from the application component information 703 shown in FIG. 8 (step S1403).

The customizing mechanism 102 further obtains the currently selected component class name 702 of the application component 106 pertaining to the application ID from the application information 701. The customizing mechanism 102 then acquires the system resource information 108 pertaining to the component class name 702 from the application component information 703 (step S1404).

On the basis of the acquired system resource information 105 and 108, the customizing mechanism 102 calculates the amount of system resources used by the relevant application 103 and the amount of system resources used by the relevant application component 106. The amount of system resources used by the application component 106 is increased or decreased by changing over the application component 106. This increase or decrease is determined by the difference between the amount of system resources used for the component class of the previously selected (previously set) application component 106 and the amount of system resources used for the component class of the currently selected (currently set) application component 106. The customizing mechanism 102 causes the amount of system resources used by the application component 106 to be reflected in the amount of system resources used by the application 103. That is, the value of increase or decrease of the application component 106 is reflected in the amount of system resources used by the application 103, and the amount of system resources used by the application 103 in which the value of increase or decrease of the application component 106 has been taken into account is calculated.

Next, on the basis of the result of causing the amount of system resources used by the application component 106 to be reflected in the amount of system resources used by the application 103, the customizing mechanism 102 calculates the sum total of the amount of system resources used inclusive of other applications (step S1405).

Next, by making a comparison, the customizing mechanism 102 determines whether the sum total of amount of system resources used falls within a usable range of system resources (usable range of prescribed system resources) decided by the application management system 100 (step S1406).

In a case where the sum total of amount of system resources used falls within the usable range of system resources, the customizing mechanism 102 sets the component class name of the selected application component 106 under the component class name 702 of the application information 701 shown in FIG. 6 (step S1407). On the other hand, in a case the sum total of amount of system resources used does not fall within the usable range of system resources, the customizing mechanism 102 notifies the component selecting command unit 109 to the effect that an error has occurred in the setting of the application component 106 (step S1408). The component selecting command unit 109 accepts this notification and discriminates the notification at step S1304. As mentioned earlier, an example of error information is when the amount of memory used exceeds the usable range by 2 MB.

Next, a procedure for creating an application component object by the customizing mechanism 102 will be described. It should be noted that what requests the customizing mechanism 102 to create the application component object is the application 103.

First, the customizing mechanism 102 accepts an application-component creation request, in which the application ID and application component name serve as parameters, from the application 103.

Next, the customizing mechanism 102 acquires the component class name of the application component 106 correlated with the application ID and application component name. This is carried out using the application information 701 depicted in FIG. 6.

Next, the customizing mechanism 102 creates the object of the component class indicated by the acquired component class name.

Next, the customizing mechanism 102 sends the created object back to the application 103.

Figure 12:
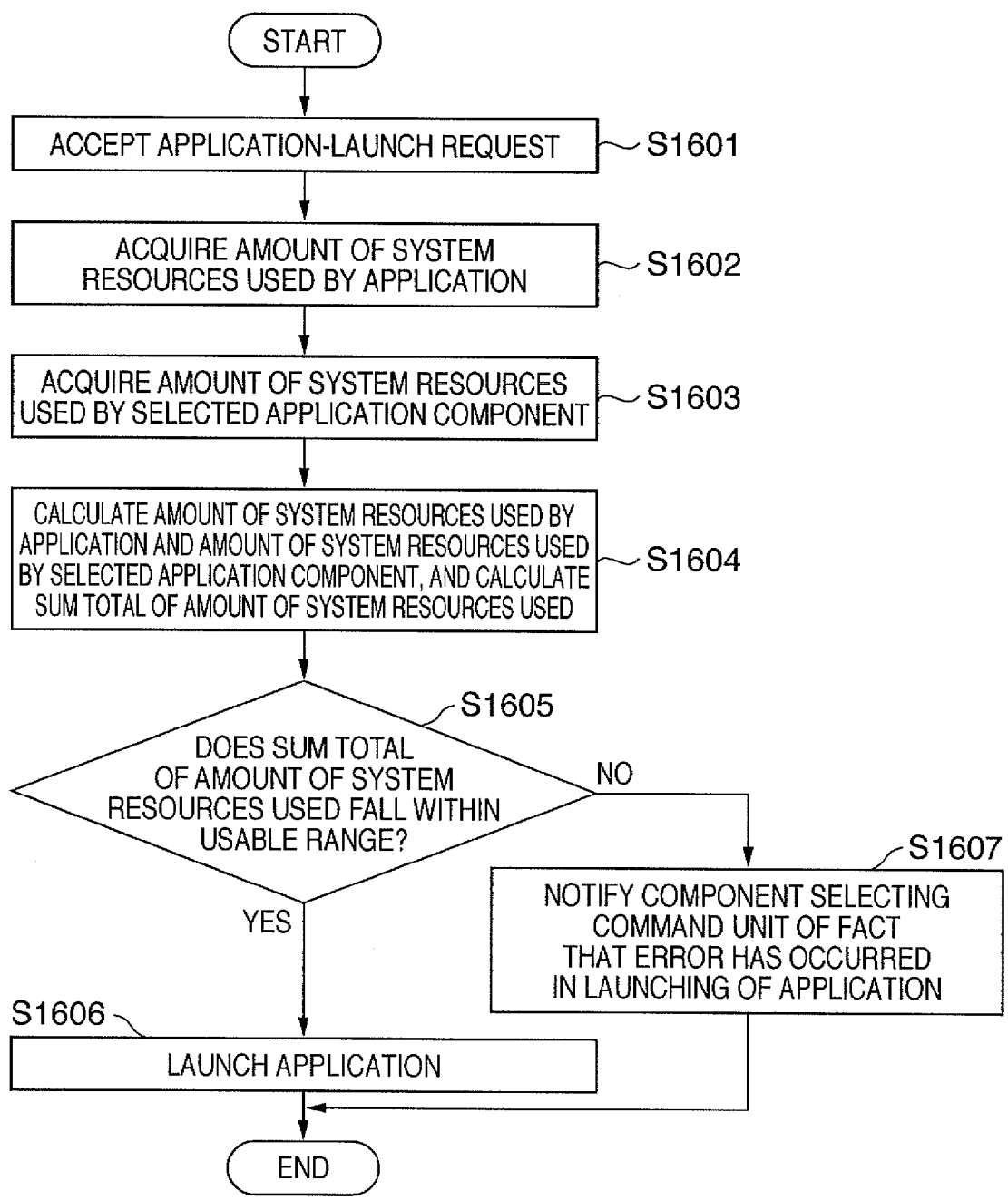
FIG. 12 is a flowchart illustrating a procedure for launching an application by an application management framework.

Reference will now be had to FIG. 12 to describe a procedure for launching an application by the application management framework 101. FIG. 12 is a flowchart illustrating a procedure for launching an application by the application management framework 101.

Once the object of a new component class is sent back to the application 103 by the above-described procedure for creating an application component object by the customizing mechanism 102, the application component 106 which is this object is used from the next launch of the application 103.

First, the application management framework 101 accepts a request to launch the application 103 (step S1601).

Next, the application management framework 101 acquires the system resource information 105 of the relevant application 103 from the application information 701 (step S1602).

Next, the application management framework 101 obtains the component class name 702 of the relevant application 103 from the application information 701. The application management framework 101 then acquires the system resource information 108 corresponding to the component class name from the application component information 703 (step S1603).

The application management framework 101 then calculates the amount of system resources used by the relevant application 103 and the amount of system resources used by the relevant application component 106. Next, the application management framework 101 obtains the sum total of amount of system resources used in a manner similar to that at step S1405 (step S1604). Here, however, it is unnecessary to find the difference between the amount of system resources used in a case where use was made of the preceding application component 106 and the amount of system resources used in a case where use was made of the current application component 106.

Next, the application management framework 101 determines whether the determined sum total of the amount of system resources used falls within the usable range of system resources decided for the application management system 100 (step S1605).

In a case where the sum total falls within the usable range of system resources, the application management framework 101 launches the application 103 (step S1606). In a case where the sum total does not fall within the usable range of system resources, the application management framework 101 does not launch the application 103 and notifies the user of the fact that an error occurred in the start-up of the application 103 (step S1607).

The embodiment described above calculates a value of increase or decrease in amount of system resources used resulting from changeover of a component of application 103, and calculates the amount of system resources used by the application 103 in which the value of increase or decrease has been taken into account. Then, based upon the calculated amount of system resources used after changeover of the component of the application 103, it is determined whether the amount of system resources used after the changeover of the component of the application 103 falls within the usable range of prescribed system resources. In accordance with this embodiment, therefore, it is possible to investigate system resources in which a change in amount of system resources used owing to changeover of the component of application 103 has been taken into account.

Further, the object of the present invention is also attained by supplying a storage medium storing the program codes of the software for implementing the functions of the foregoing embodiment to a system or an apparatus, reading the program codes with a computer of the system or apparatus from the storage medium, and then executing the program codes.

In this case, the program codes read from the storage medium implement the novel functions of the embodiment and the program codes per se and storage medium storing the program codes constitute the invention.

A flexible disk, hard disk, optical disk, magneto-optical disk, CD-ROM, CD-R, magnetic tape, non-volatile type memory card or ROM, etc., can be used as storage media that supply the program code.

Further, a case where an operating system or the like running on the computer executes some or all of the actual processing based upon the indications in the program codes read by the computer, and the functions of the embodiment are implemented by this processing also is covered by the invention.

Furthermore, after program code read from a recording medium is written to a memory provided on a function expansion unit or the like connected to a computer, a CPU or the like performs the actual processing based upon the indication in the program codes, and the functions of the above embodiment are implemented by this processing. Such a case also is covered by the present invention.

Furthermore, an arrangement in which program code is supplied to a computer via a communication medium such as the Internet also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-023383, filed Feb. 1, 2007, which is hereby incorporated by reference herein in its entirety.

What is claimed is:

1. A management system for managing a component used by an application, said system comprising a processor that includes:
    an input unit adapted to input a command for changing over a used class of a used component to a different class of a different component used by an application; and
    a determination unit adapted to determine whether to allow changeover to the different class of the different component in accordance with an amount of resources, which are used by the different class of the different component after the changeover, set for the different class of the different component after the changeover in response to the command, wherein said determination unit compares the amount of resources with a usable range of system resources, wherein, in a case where the amount of resources falls within the usable range of system resources, said determination unit allows the changeover to the different class of the different component, wherein, in a case where the amount of resources does not fall within the usable range of system resources, said determination unit does not allow the changeover to the different class of the different component, and wherein said determination unit includes a registration unit adapted to register, in said system, an amount of resources used by respective classes of a plurality of components, said determination unit determining whether to allow changeover of the different class of the different component in accordance with the amount of resources registered by the registration unit when the different class of the different component is installed.

2. The system according to claim 1, wherein said determination unit determines whether to allow changeover of the different class of the different component in accordance with an amount of resources used by an application that uses the class of the component before the changeover, and an amount of resources used by the different class of the different component after the changeover.

3. The system according to claim 1, wherein said determination unit determines whether to allow changeover of the different class of the different component in accordance with at least any one among memory capacity, hard-disk capacity, number of files, number of sockets, and number of threads used by the different class of the different component after the changeover.

4. A management method for managing a component used by an application, said method comprising:

an input step of inputting a command for changing over a used class of a used component to a different class of a different component used by an application; and a determination step of determining whether to allow changeover to the different class of the different component in accordance with an amount of resources, which are used by the different class of the different component after the changeover, set for the different class of the component after the changeover in response to the command, wherein said determination step compares the amount of resources with a usable range of system resources, wherein, in a case where the amount of resources falls within the usable range of system resources, said determination step allows the changeover to the different class of the different component, wherein, in a case where the amount of resources does not fall within the usable range of system resources, said determination step does not allow the changeover to the different class of the different component, and wherein said determination step includes a registration step of registering, in a system, an amount of resources used by respective classes of a plurality components, said determination step determining whether to allow changeover of the different class of the different component in accordance with the amount of resources registered at said registration step when the different class of the different component is installed.

5. The method according to claim 4, wherein said determination step determines whether to allow changeover of the different class of the different component in accordance with an amount of resources used by an application that uses the class of the component before the changeover, and an amount of resources used by the different class of the different component after the changeover.

6. The method according to claim 4, wherein said determination step determines whether to allow changeover of the different class of the different component in accordance with at least any one among memory capacity, hard-disk capacity, number of files, number of sockets, and number of threads used by the different class of the different component after the changeover.

7. A management system for managing an application, said system comprising a processor that includes:

an input unit adapted to input a command for launching an application; and a determination unit adapted to determine whether to allow launch of an application in accordance with an amount of resources, which are used by a class of a component, set for the component used by the application for which launch has been commanded, wherein said determination unit compares the amount of resources with a usable range of system resources, wherein, in a case where the amount of resources falls within the usable range of system resources, said determination unit allows the launch of the application, wherein, in a case where the amount of resources does not fall within the usable range of system resources, said determination unit does not allow the launch of the application, and wherein said determination unit includes a registration unit adapted to register, in said system, an amount of resources used by respective classes of a plurality of components, said determination unit determining whether to allow launch of an application in accordance with the amount of resources registered by the registration unit when the class of the component is installed.

8. The system according to claim 7, wherein said determination unit determines whether to allow launch of an application in accordance with an amount of resources used by an application that uses the class of the component, and an amount of resources used by the class of the component.

9. The system according to claim 7, wherein said determination unit determines whether to allow launch of an application in accordance with at least any one among memory capacity, hard-disk capacity, number of files, number of sockets, and number of threads used by the class of the component.

10. A management method for managing an application, comprising:

an input step of inputting a command for launching an application; and a determination step of determining whether to allow launch of an application in accordance with an amount of resources, which are used by a class of a component, set for the component used by the application for which launch has been commanded, wherein said determination step compares the amount of resources with a usable range of system resources, wherein, in a case where the amount of resources falls within the usable range of system resources, said determination step allows the launch of the application, wherein, in a case where the amount of resources does not fall within the usable range of system resources, said determination step does not allow the launch of the application, and wherein said determination step has a registration step of registering, in a system, the amount of resources used by respective classes of a plurality of components, said determination step determining whether to allow launch of an application in accordance with the amount of resources registered at the registration step when the class of the component is installed.

11. The method according to claim 10, wherein said determination step determines whether to allow launch of an application in accordance with an amount of resources used by an application that uses the class of the component, and an amount of resources used by the class of the component.

12. The method according to claim 10, wherein said determination step determines whether to allow launch of an application in accordance with at least any one among memory capacity, hard-disk capacity, number of files, number of sockets, and number of threads used by the class of the component.

13. A non-transitory computer-readable storage medium storing a computer program for a method for managing a component used by an application, the method comprising:
 inputting a command for changing over a used class of a component to a different class of a component used by an application; and
 determining whether to allow changeover to the different class of the component in accordance with an amount of resources, which are used by a class of a component after the changeover, set for the different class of the component after the changeover in response to the command,
wherein said determination step compares the amount of resources with a usable range of system resources,
wherein, in a case where the amount of resources falls within the usable range of system resources, said determination step allows the launch of the application,
wherein, in a case where the amount of resources does not fall within the usable range of system resources, said determination step does not allow the launch of the application, and
wherein said determination step has a registration step of registering, in a system, the amount of resources used by respective classes of a plurality of components, said determination step determining whether to allow launch of an application in accordance with the amount of resources registered at the registration step when the class of the component is installed.

* * * * *